Patented Nov. 17, 1953

2,659,753

UNITED STATES PATENT OFFICE 2,659,753

PREPARATION OF MIXED AROMATIC-ALIPHATIC ETHERS

Ralph E. Plump, Pittsfield, Mass., assignor to The Pennsylvania Salt Manufacturing Company, Philadelphia, Pa., a corporation of Pennsylvania No Drawing. Application May 20, 1950, Serial No. 163,327

9 Claims. (Cl. 260—521)

This invention relates to improvements in the manufacture of aromatic ethers and more particularly to the preparation of mixed aromatic-aliphatic ethers through the reaction of metal salts of aryl hydroxyls with halo organic acids, aryl hydroxide as herein used including the phenols and the polynuclear aromatic compounds having hydroxyl groups such as the naphthols.

It has heretofore been the practice when making organic acid ethers of the mixed aromatic-aliphatic type to melt an alkali or alkaline earth metal salt of an aryl hydroxyl together with a metal salt of a halo organic acid, or to boil dilute aqueous solutions of these materials together under reflux for several hours, the term "metal salts" as used herein and in the appended claims referring to the alkali and alkaline earth metal salts including the element magnesium. This type of reaction is best illustrated by the type formula $$ROA + R'Hal \cdot COOH \rightarrow R-O-R' + A-Hal$$

wherein R is an aryl group, R' is an aliphatic organic radical and A is an alkali or alkaline earth metal. Either of these methods is open to objection in that there is a high percentage of side reaction products formed and considerable difficulty is encountered in separating the prepared ethers from the reaction mass, it being necessary to extract the ethers with various solvents. Solvent extraction, however, is objectionable due to the extra handling and the cost of the solvents and their recovery.

I have now discovered that if the above reaction is carried out in a substantially saturated aqueous solution of an inorganic salt not reacting with the desired reaction products and having a water solubility not substantially less than that of sodium chloride, the formation of side reaction products is considerably reduced, the necessary reaction time is decreased, and the necessity for solvent extraction of the ether from the reaction mass is eliminated. This process will hereinafter be referred to as the brine method.

In practicing our invention, we prefer to use a substantially saturated aqueous solution of sodium chloride as the reaction medium, though other salts having a high solubility in water such as Na$_2$SO$_4$, KNO$_3$ and MgCl$_2$ may be employed as heretofore stated. The reactants, which are alkali or alkaline earth metal salts of aryl hydroxyls and halo organic acids are preferably present in the brine medium in the stoichiometric amounts necessary for the formation of the desired ether. However, the invention is not limited to the specific amounts of the reactants employed since the use of a saturated aqueous inorganic salt reaction medium appears to be beneficial regardless of excess amounts of either reactant. The aqueous inorganic salt solution, with the reactants, is heated, preferably to boiling, until the ether begins to precipitate out, the heating being continued until the reaction is substantially complete. The reaction mass is then preferably cooled to room temperature and the ether product, which precipitates out, removed, preferably by filtering.

The ether yield, calculated on the basis of the halo organic acid reactant employed, can be substantially increased if the filtrate remaining after the removal of the ether product is used as the reaction medium for the next reaction batch. Since the halo organic acid is frequently the more expensive of the reactants used, it is apparent that there is substantial economic advantage to be gained by utilization of the filtrate in the manner described. For example, in the preparation of 2,4-dichlorophenoxyacetic acid, the utilization of the chloro acetic acid is improved by as much as 10% through the use of the filtrate as the reaction medium in following batches. Obviously, this procedure is also well adapted to continuous processes.

Some of the advantages of our present invention immediately become apparent when the following illustrative comparison with the prior art methods, in the production of 2,4-dichlorophenoxyacetic acid, is considered. When 2,4-dichlorophenoxyacetic acid was prepared from 2,4-dichlorophenol and chloro acetic acid by melting together the 2,4-dichlorophenol, chloro acetic acid and a strong solution of caustic soda, or by boiling these reactants under reflux for from 6 to 8 hours in a dilute aqueous solution of their sodium salts, the yield was found to be only about 55%. Furthermore, considerable difficulty was encountered in separating the 2,4-dichlorophenoxyacetic acid from the unreacted 2,4-dichlorophenol, it being necessary to use solvent extraction to separate out the sodium salt of the 2,4-dichlorophenoxyacetic acid formed. However, when the reaction was carried out in a substantially saturated aqueous solution of sodium chloride, the yield was increased to as much as 78% and the reaction time was considerably reduced, the reaction taking somewhat less than 1 hour. Furthermore, when the reaction was carried out in a brine medium, the problem of separating the resulting sodium salt of the 2,4-dichlorophenoxyacetic acid from the reaction mixture was found to be considerably simplified, since, on cooling the reaction products, the sodium salt of the 2,4-dichlorophenoxyacetic acid precipitated out leaving the unreacted 2,4-dichlorophenol and chloro acetic acid in the solution.

In practicing my invention, the reaction mixture should preferably be maintained within a pH range of approximately 7 to 10, better yields being obtained if the reaction medium is slightly alkaline. For the preparation of 2,4-dichlorophenoxyacetic acid and similar phenoxyacetic acid ethers in accordance with my invention, the best yields are observed when the pH of the reaction mixture is maintained in a range of approximately 9.5 to 10.

In order to better illustrate the practice of my invention, the following examples are given. It is understood, however, that these examples are given by way of illustration only and the invention is not to be limited to the specific examples employed.

Example 1

16.3 grams of 2,4-dichlorophenol and 8.8 grams of sodium hydroxide were added to approximately 100 ml. of a substantially saturated solution of sodium chloride. The mixture was brought to boiling and a solution of 9.4 grams monochloro acetic acid, dissolved in an equal weight of water added. The resulting mixture was boiled gently for about one-half hour after which time it was noted that a silky fibrous slurry was formed. The boiling was continued until no further formation of the fibrous slurry was noted. The batch was then cooled to room temperature and the sodium salt of the 2,4-dichlorophenoxyacetic acid, which had separated out, was removed by filtration. The yield of 2,4-dichlorophenoxyacetic acid was 68 mol per cent.

Example 2

2,4-dichlorophenoxyacetic acid was prepared in a manner similar to that described in Example 1. However, the pH of the reaction mixture was maintained at 9.5 to 10 by the continuous addition of aqueous sodium hydroxide throughout the reaction period. The yield obtained was 95% based on the phenol, as compared with 76.3% obtained when the pH was held at an average of about 8.8.

Example 3

0.1 mol each of 2,4-dichlorophenol and sodium hydroxide were added to 100 ml. of a saturated sodium chloride solution. To this was added 0.1 mol of chloro acetic acid which had been neutralized with a 10% solution of sodium hydroxide. The resulting mixture was boiled for about an hour and then cooled to room temperature. The solid sodium salt of the 2,4-dichlorophenoxyacetic acid, which had separated out, was removed by filtration. The mol yield was found to be approximately 78%. The brine filtrate was charged with enough of the phenol, caustic soda and neutralized chloro acetic acid to bring it back to the original 0.1 mol strength (assuming no loss by side reaction). This solution was boiled an hour and again the product was removed and again the recycle liquor was adjusted and boiled for a third hour.

The following tabulated results show not only that an excellent overall yield of 88.6% was obtained, but also that the utilization of the chloro acetic acid improved from 78.2% to 97%.

| Recycle | Grams $Cl_2C_6H_3OH$ | Grams $ClCH_2COOH$ | Grams Prod. | Mol Percent Yield |
|---|---|---|---|---|
| 0 | 16.3 | 9.4 | 17.2 | 78.2 |
| 1 | 12.8 | 7.3 | 15.7 | 90.7 |
| 2 | 11.6 | 6.7 | 15.3 | 97.0 |
| Total | 40.7 | 23.4 | 48.2 | 88.6 |

Example 4

148.5 grams of 2,4,5-trichlorophenol (0.75 mol) were added, together with 30 grams of NaOH (0.75 mol), to 750 cc. of saturated sodium chloride solution. The solution was heated to near boiling and a neutralized solution of 72 grams chloro acetic acid (0.75 mol) added. The mixture was heated under reflux for one hour, after which time it was allowed to cool. The pH of the mixture on testing was found to be 8. The reaction batch was filtered and the precipitate then acidified by the addition of about 50.6 grams of concentrated HCl, together with about 750 cc. of water. The mixture, which had heated up on acidification, was cooled and the trichlorophenoxyacetic acid was filtered off by means of suction. The precipitate, after air drying, was found to have a melting point of 148–150° C. and weighed 147.6 grams. The percent yield based on trichlorophenol input was 76.9%.

Example 5

Using substantially the same procedure of Example 4, 10.8 grams of p-cresol (0.1 mol) was reacted with 9.6 grams of chloro acetic acid (0.1 mol). The pH of the reaction was about 8–10, the pH being somewhat higher than 10 when refluxing was first started.

The crude yield of p-cresoxyacetic acid obtained was 91% based on the p-cresol input.

Example 6

By using a procedure similar to that of Example 4, 91.0% yield of crude β-naphthoxyacetic acid was obtained. In this experiment 14.4 grams of β-hydroxynaphthalene were reacted with 9.6 grams of chloro acetic acid. On testing, after the refluxing had been discontinued, the pH of the reaction mass was found to be 8.

Example 7

Using the procedure of Example 4, 0.1 mol of p-tertiaryamyl phenol was reacted with 0.1 mol of acetic acid. The pH at the end of the reflux period was 8. The yield of p-tertiaryamyl-phenoxyacetic acid obtained was 83% based on the phenol input.

Example 8

The compound 2(0-chlorophenyl) phenoxyacetic acid was prepared by reacting together 0.1 mol qualities of 2-chloro-2'-hydroxy diphenyl and chloro acetic acid, the reaction procedure being substantially the same as that of Example 4. The yield of 2(0-chlorophenyl) phenoxyacetic acid obtained was 86% based on the 2-chloro-2'-hydroxy diphenyl input.

Example 9

The following compounds further illustrate the variety of compounds already prepared by my brine method. The compounds were prepared in each instance by using as starting materials the aryl hydroxide and a halo derivative of the organic acid present in the compound. The procedure was substantially the same as that of Exp-Nitrophenoxyacetic acid
p-Formylphenoxyacetic acid
Hydroquinone-o,o-diacetic acid
Phenoxyacetic acid
o-Cresoxyacetic acid
m-Cresoxyacetic acid
o-Formylphenoxyacetic acid
3-methyl-4-chlorophenoxyacetic acid
2-methyl-4-chlorophenoxyacetic acid
o-Carboxyphenoxyacetic acid
α-Phenoxyacetic acid
2-methyl-4-fluorophenoxyacetic acid
α-Phenoxycrotonic acid Numerous examples have been given of specific compounds which have been prepared by my brine method. The invention, however, is not limited to the preparation of these specific compounds since my brine method if desired can advantageously be employed in the preparation of any organic acid ether of the mixed aromatic-aliphatic type as long as the alkaline or alkaline earth metal salts of the reactants are sufficiently soluble in water to enable the reaction to proceed. Thus, for example, the brine method of my invention can be used for the preparation of varied organic acid ethers of the type $$ArO \cdot CHR-(CH_2)_n \cdot COOH$$

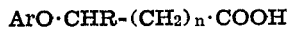

where R is methyl, ethyl or ethenyl, propyl or propenyl; $n$ is 0, 1, 2, or 3; and Ar is a substituted or unsubstituted aromatic or condensed aromatic radical.

Having thus described my invention, I claim:

1. In the preparation of mixed aromatic ethers by reacting in aqueous solutions the metal salts of aryl hydroxides with compounds of the group consisting of halo aliphatic and alicyclic acids the improvement comprising carrying out said reaction under alkaline conditions in a substantially saturated aqueous solution of an inorganic salt having a water solubility not substantially less than that of sodium chloride.

2. A process for the production of mixed aromatic ethers which comprises effecting under alkaline conditions in a substantially saturated aqueous solution of a salt having a water solubility not substantially less than that of sodium chloride, a reaction between the metal salts of an aryl hydroxide and chloro acetic acid.

3. The process of claim 2 in which the phenol is 2,4-dichlorophenol.

4. The process of claim 1 in which the salt with which the aqueous solution is substantially saturated is sodium chloride.

5. The process of claim 2 in which the salt with which the aqueous solution is substantially saturated is sodium chloride.

6. The method of making 2,4-dichlorophenoxyacetic acid comprising reacting in a substantially saturated solution of sodium chloride, a metal salt of 2,4-dichlorophenol and chloro acetic acid while maintaining the pH of the reaction mixture within a range of approximately 7 to 10.

7. The method of claim 6 in which the pH of the reaction mixture is maintained within a range of 9.5 to 10 and in which the metal salts are the sodium salts.

8. In the preparation of mixed aromatic ethers by reacting in aqueous solutions the metal salts of aryl hydroxides with compounds of the group consisting of halo aliphatic and alicyclic acids the improvement comprising refluxing said reactants in an alkaline aqueous solution substantially saturated with an inorganic salt having a water solubility not substantially less than that of sodium chloride, cooling the reaction mixture, removing the solid ether product formed, refortifying the remaining liquor with additional amounts of said reactants to replace those reacted, again refluxing the reaction mixture until additional ether product is formed, and repeating the steps for removing this ether product from the remaining reactants.

9. A process for the production of 2,4-dichlorophenoxyacetic acid which comprises refluxing a solution of the sodium salt of 2,4-dichlorophenol and the sodium salt of chloro acetic acid in an alkaline aqueous solution substantially saturated with sodium chloride while maintaining the alkalinity of the solution within a pH range of approximately 9.5 to 10, cooling the reaction mixture to precipitate out the sodium salt of the 2,4-dichlorophenoxyacetic acid formed, removing the solids from said cooled reaction mixture, refortifying the remaining liquor with additional sodium salts of 2,4-dichlorophenol and chloro acetic acid to replace those already reacted, again refluxing the reaction mixture until additional sodium salt of 2,4-dichlorophenoxyacetic acid is formed and repeating the steps for removing this ether product from the remaining reactants.

RALPH E. PLUMP.

References Cited in the file of this patent

UNITED STATES PATENTS

| Number | Name | Date |
|---|---|---|
| 2,511,784 | O'Neal | June 13, 1950 |
| 2,516,611 | Berhenke et al. | July 25, 1950 |

FOREIGN PATENTS

| Number | Country | Date |
|---|---|---|
| 573,476 | Great Britain | Nov. 22, 1945 |
| 948,477 | France | Jan. 31, 1949 |

OTHER REFERENCES

Berhenke et al.: Ind. Eng. Chem., vol. 38, pp. 544–6 (1946).

Koelsch: J. Am. Chem. Soc., vol. 53, pp. 304–5 (1931).

Hougen et al.: "Chem. Proc. Principles," Wiley, Pt. I, pp. 182–3 (1943).